No. 830,111. PATENTED SEPT. 4, 1906.
W. L. ST. CLAIR.
MACHINE FOR MAKING AND RE-PRESSING BRICKS.
APPLICATION FILED MAR. 6, 1905.

5 SHEETS—SHEET 1.

Witnesses:
F. A. Wiswell.
J. F. Morris

Inventor:
William L. St. Clair.

No. 830,111. PATENTED SEPT. 4, 1906.
W. L. ST. CLAIR.
MACHINE FOR MAKING AND RE-PRESSING BRICKS.
APPLICATION FILED MAR. 6, 1905.

5 SHEETS—SHEET 2.

Witnesses:
F. A. Wiswell.
J. F. Morris

Inventor:
William L. St. Clair.

No. 830,111. PATENTED SEPT. 4, 1906.
W. L. ST. CLAIR.
MACHINE FOR MAKING AND RE-PRESSING BRICKS.
APPLICATION FILED MAR. 6, 1905.
5 SHEETS—SHEET 3.

Witnesses:
F. A. Wiswell
J. F. Morris

Inventor:
William L. St. Clair.

No. 830,111. PATENTED SEPT. 4, 1906.
W. L. ST. CLAIR.
MACHINE FOR MAKING AND RE-PRESSING BRICKS.
APPLICATION FILED MAR. 6, 1905.
5 SHEETS—SHEET 4.
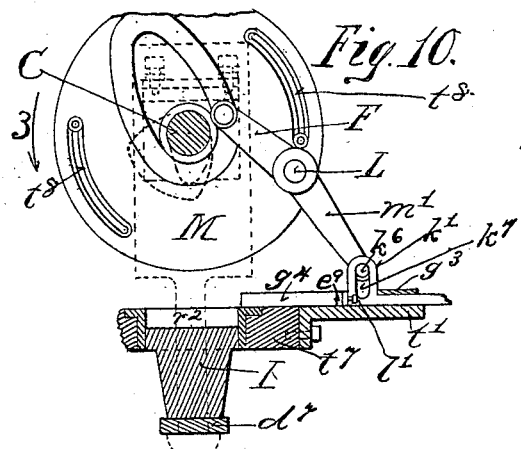
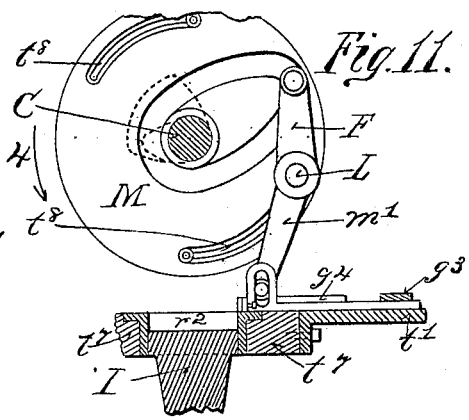
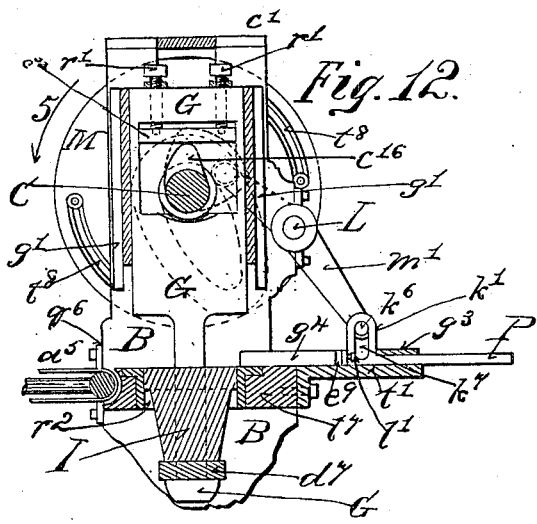
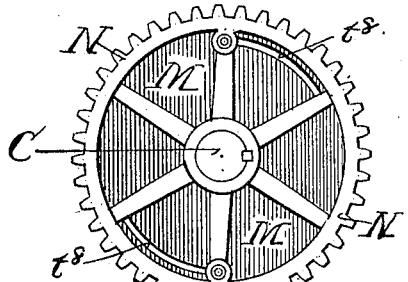
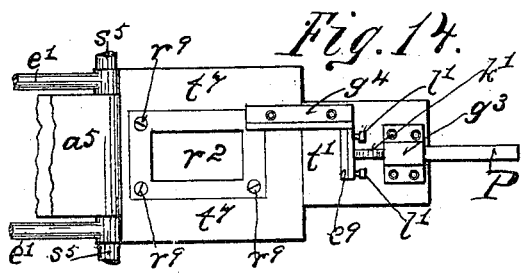
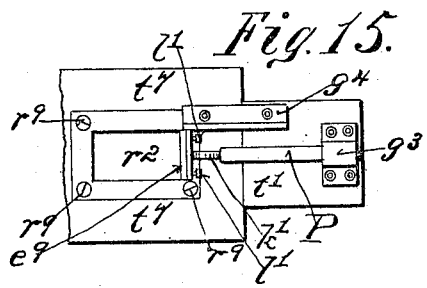
Witnesses:
F. A. Wiswell.
J. F. Morris.
Inventor:
William L. St. Clair No. 830,111. PATENTED SEPT. 4, 1906.
W. L. ST. CLAIR.
MACHINE FOR MAKING AND RE-PRESSING BRICKS.
APPLICATION FILED MAR. 6, 1905.
5 SHEETS—SHEET 5.
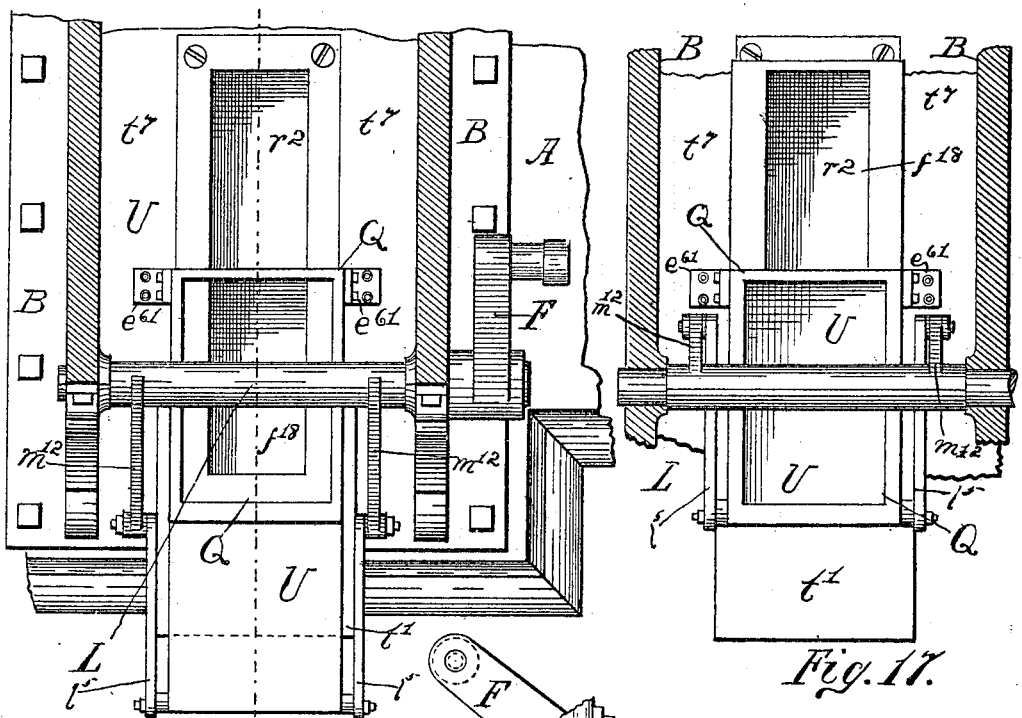
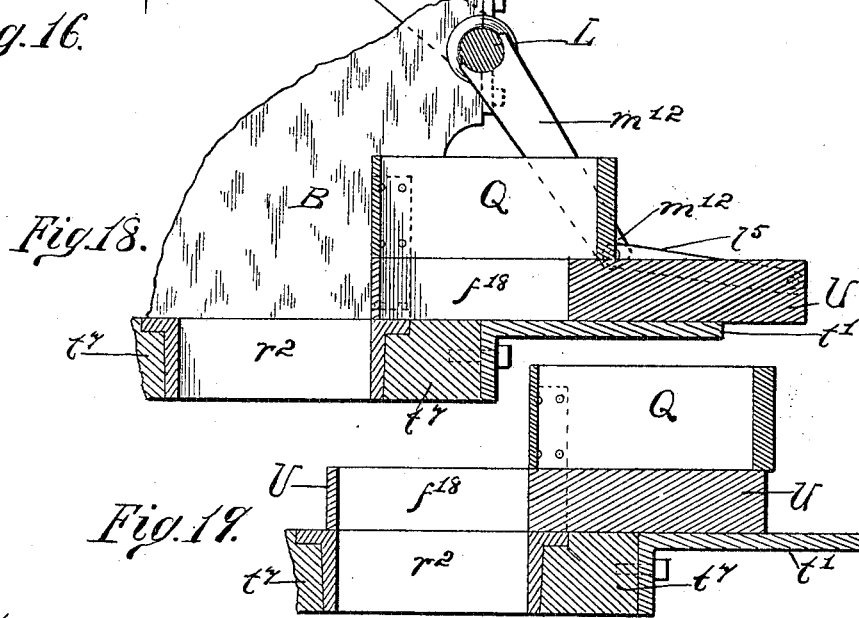
Witnesses:
Inventor:
William L. St. Clair.

UNITED STATES PATENT OFFICE.

WILLIAM L. ST. CLAIR, OF SALT LAKE CITY, UTAH.

MACHINE FOR MAKING AND RE-PRESSING BRICKS.

No. 830,111.      Specification of Letters Patent.      Patented Sept. 4, 1906.

Application filed March 6, 1905. Serial No. 248,731.

*To all whom it may concern:*

Be it known that I, WILLIAM L. ST. CLAIR, a citizen of the United States, residing at Salt Lake City, in the county of Salt Lake and State of Utah, have invented a new and useful Machine for Making and Re-Pressing Brick, of which the following is a specification.

The object of my invention is to provide an improved brick-pressing machine in which the working and wearing parts are arranged above the mud and dust and not subjected to the wear of machines having their wearing parts below the operative mud and in which the parts are so arranged that they may effectively mold dry pressed brick in an expeditious manner and may also by changing a few minor parts re-press stiff-mud brick.

The invention consists in certain constructions, arrangements, and combinations of parts hereinafter fully described and claimed, reference being had to the accompanying drawings, in which—

Figure 1:
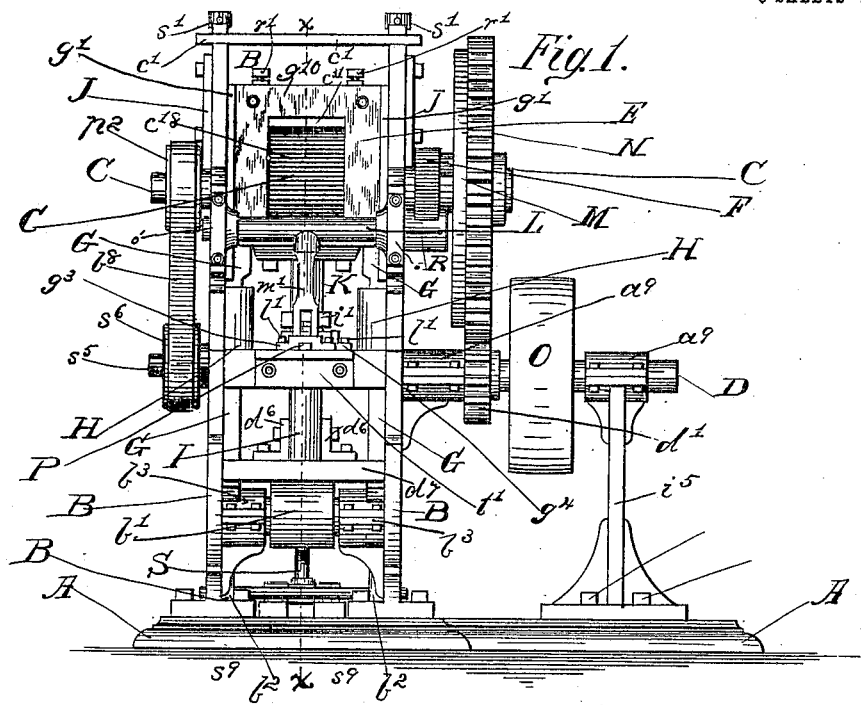
Figure 2:
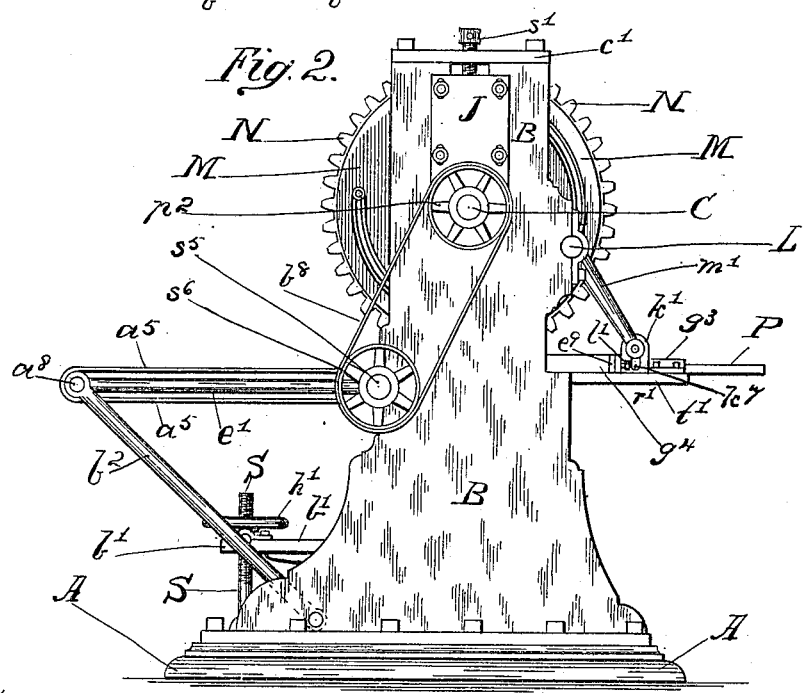
Figure 3:
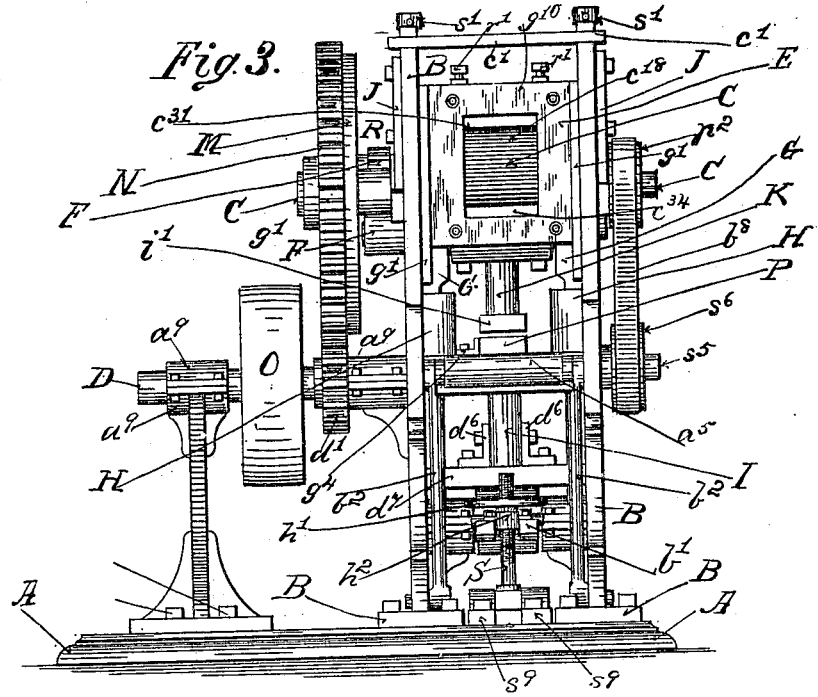
Figure 4:
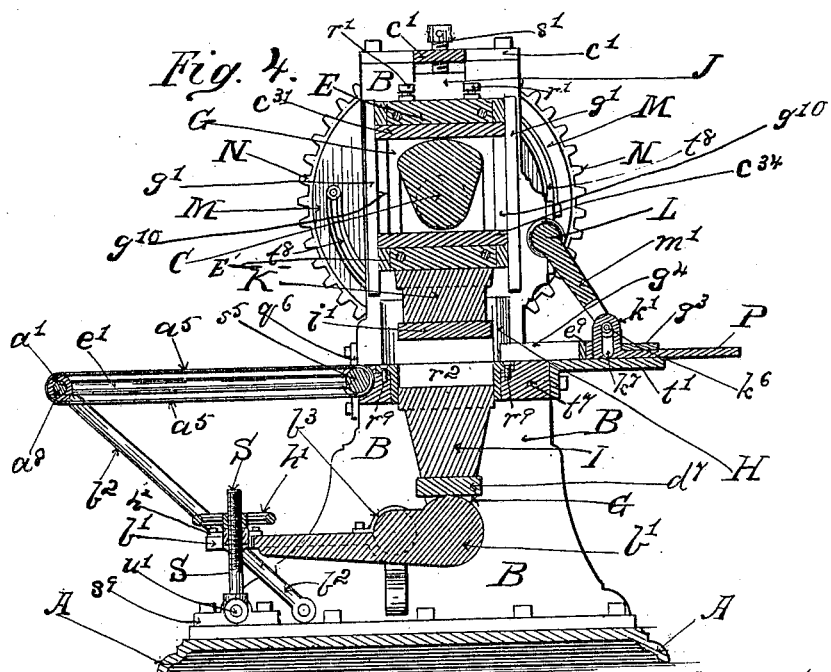
Figure 5:
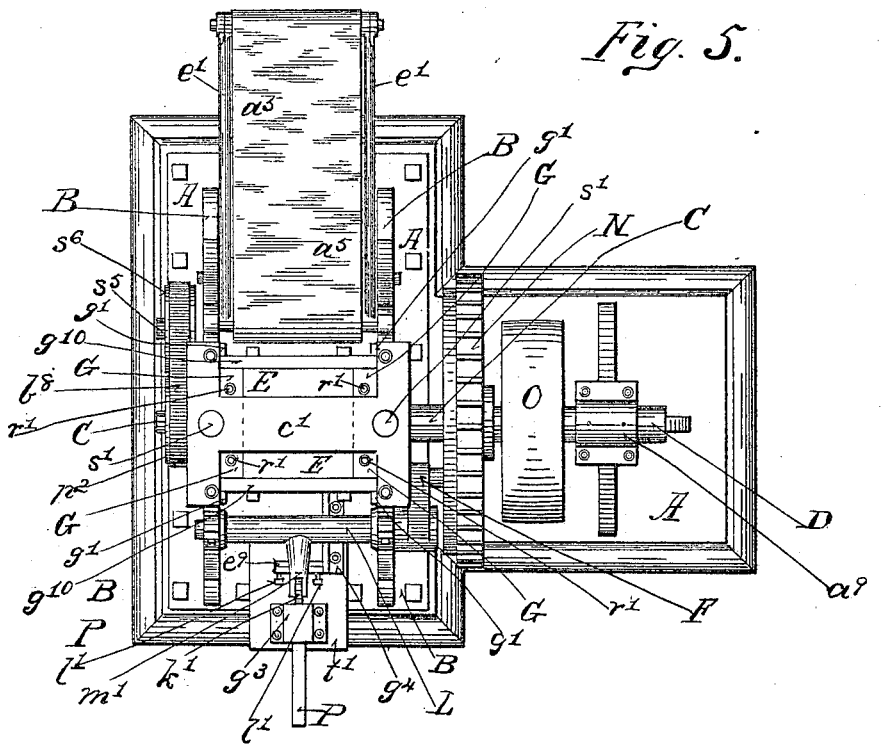
Figure 6:
Figure 7:
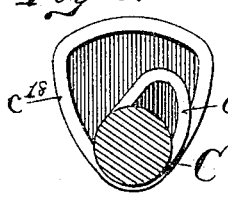
Figure 7:
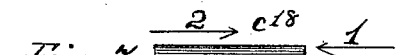
Figure 8:
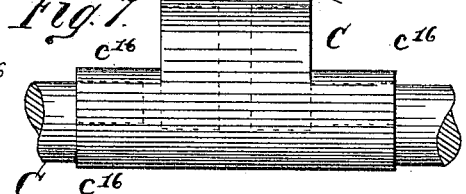
Figure 8:
Figure 9:
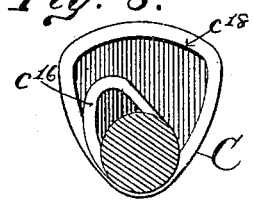

Figure 1 is a front elevation of my improved brick-pressing machine. Fig. 2 is a side elevation thereof. Fig. 3 is a rear elevation. Fig. 4 is a vertical transverse section on the line X X of Fig. 1. Fig. 5 is a top plan view. Figs. 6, 7, and 8 are views of cams employed, Figs. 6 and 8 being sectional views in the direction of the darts 1 and 2, respectively, of Fig. 7. Fig. 9 is a detail sectional view illustrating a portion of the mold-table, the mold, and the feeding-slide, the latter being arranged at the outer limit of its movement. Figs. 10 and 11 are detail sectional views illustrating the feeding-slide and its actuating mechanism in two different positions. Fig. 12 is a vertical sectional view illustrating the lower plunger-level with the top of the mold-table and also illustrating in side elevation one of the cam-staffs and its guides. Fig. 13 is a detail view of the spur-wheel designed to drive the cam-shaft and the cam secured to said spur-wheel in an adjustable manner, the said cam being designed to actuate the feeding-slide and being shown in Figs. 10 and 11 from the opposite side. Figs. 14 and 15 are detail plan views illustrating the feeding-slide in different relative positions to the mold. Fig. 16 is a top plan view, with parts in section, of a portion of the machine, illustrating in what respects the machine is changed to transform it from a re-press to a dry press. Fig. 17 is a similar view illustrating the feed-box at the inner limit of its movement. Fig. 18 is a detail transverse sectional view of the parts shown in Fig. 16 and in the same relative position. Fig. 19 is a view similar to Fig. 18, except that some parts are omitted and the other parts are shown arranged as illustrated in plan view in Fig. 17.

Corresponding and like parts are referred to in the following description and indicated in all the views of the drawings by the same reference characters.

The base A of the machine supports the framework B, consisting of vertical side members or standards, as best illustrated in Fig. 2. The base also supports a journal-standard $i^5$, and the latter and the adjacent side member of the frame B carry journal-bearings $a^9$, in which the driving-shaft D is journaled.

The shaft D is provided with a pulley O, by which the machine may be driven from any prime mover. The shaft D also carries a spur-pinion $d'$, meshing with a larger spur-wheel N on one end of a transverse cam-shaft C, journaled in the two side members of the frame B, the wear of said shaft being taken up by means of plates J, adjustably mounted in the side members of the frame at the upper end thereof and adjusted by means of screws $s'$, working in cap-plates $c'$.

The cam-shaft C is connected, by means of a belt $b^8$, to a lower transverse shaft $s^5$, journaled in boxings $q^6$ and designed to support an endless delivery-apron $a^5$, running in a horizontal direction, and coacting with the shaft $s^5$ for the support of the apron is a roller $a'$, mounted upon a transverse shaft $a^8$, and the latter is held in its proper position by means of struts $b^2$ and horizontal supporting-rods $e'$. By means of the said supporting-rods the roller $a'$ and shaft $a^8$ may be adjusted as to their distances from the shaft $s^5$. Within the framework is mounted a mold $r^2$ in horizontal alinement with the upper lap of the endless apron $a^5$. This mold $r^2$ is held by screws $r^9$ in the mold-table $t^7$, and the latter at a point opposite the receiving end of the delivery-apron $a^5$ is provided with an extension $t'$ of angular formation, as best seen in Fig. 9.

The extension $t'$ of the mold-table has secured to it a transverse guide strap or bracket $g^3$, in which the feeding-slide P is guided. The said feeding-slide is provided at its front end with a transverse feed-bar $e^9$, adjustably secured thereto by means of set-screws $l'$, so that the said bar may be adjusted for bricks of different lengths. At one side of the feeding-slide is a longitudinal guide $g^4$, designed to contact with one end of the feed-bar $e^9$ to guide the same in connection with the guide $g^3$.

The feeding-slide P is provided with a vertically-extending ear $k'$, provided with an elongated slot $k^7$, designed to receive the roller $k^8$ on a small shaft $k^6$, secured in the lower end of an arm $m'$, projecting from a rock-shaft L. The rock-shaft L extends transversely of the framework and is journaled in boxings $o'$. It is provided with an arm F, having a laterally-extending end fitting within a cam-groove in the cam-disk M, screwed to the spur-wheel N, and the connection between said cam-disk and the spur-wheel is through circumferential slots $t^8$ and bolts mounted in said slots, so that the cam-disk may be adjusted axially and held in different relative positions on the spur-wheel N. By means of the cam-disk M and the spur-wheel N the rock-shaft L obtains its rocking motion to effect the reciprocation of the feeding-slide P, so as to feed a brick into the mold $r^2$ and also sweep it past said mold, after being pressed or re-pressed, onto a delivery-apron $a^5$ by pushing against it the next brick to be fed into the mold.

My machine embodies a lower plunger I, designed to reciprocate vertically in the lower end of the mold $r^2$ and supported on a cross-head $d^7$, the cross-head at the lower limit of its movement contacting with a lever $d'$ adjustably mounted on a transverse shaft in boxings $b^3$, so that the lever may rock in a vertical plane, one end of said lever receiving a threaded rod S, swiveled on a shaft $u'$ in a boxing $s^9$ on the base A. Above the lever $b'$ the said rod S has mounted on it a hand-wheel $h'$, which is screw-threaded, as is also the rod S, and by this means the lever $b'$ may be tilted to different positions, so as to limit the downward movement of the plunger I at different elevations. The machine also embodies an upper plunger $i'$, which is detachably connected to a support K and is designed to move vertically above and into the mold $r^2$ in vertical alinement with the lower plunger I.

The actuating means for the two plungers before described is constituted by two cams $c^{16}$ on the cam-shaft C and an intermediate cam $c^{18}$, working within a cam-housing composed of front and back plates $g^{10}$, top and bottom plates E and E', respectively, and upper and lower wear-plates $c^{31}$ and $c^{34}$, respectively. The cam-housing carries the support K for the upper plunger $i'$, said support being directly connected to the lower plate E', and the said housing is guided by means of four vertical guide-strips $g'$, secured to the inner sides of the side members of the frame B. The guide-strips $g'$, as best seen in Fig. 5, contact with the outer sides of the front and back plates $g^{10}$ at the edges thereof.

To the cross-head $d^7$ for the lower plunger I two cam-staffs G are secured, said cam-staffs having reduced lower ends, as shown in Fig. 12, that are directly connected to cross-head $d^7$ and being provided at their upper ends with suitable openings to receive the cams $c^{16}$. In these openings wear-plates $c^{33}$ are adjustably secured by means of set-screws $r'$, said wear-plates receiving the direct wear of the cams $c^{16}$. By reference particularly to Figs. 4, 5, and 12 it will be noted that the cam-staffs G are guided at their upper ends within the cam-housing before described, being guided at one side by the front and back plates $g^{10}$ at the sides thereof and being supported on their outer faces by means of the framework B and supported below the cam-housing by guides H. It is to be understood that while the cam-housing for the cam $c^{18}$ assists in guiding the cam-staffs G said housing and said cam-staffs are independently movable.

In the practical operation of my improved brick-machine when the same is arranged to re-press brick a brick is placed on the mold-table against the guide $g^4$ and in advance of the feed-bar $e^9$, and as the machine is driven the rocking of the shaft L will move the slide P from its outer position, (shown in Fig. 9,) where it is limited by contact with the cross-guide $g^3$, to an inner position, by which it will feed the brick into the mold. The simultaneous rotation of the cam-shaft C will turn the cam $c^{18}$ downwardly against the lower wear-plate $c^{34}$, which will result in pressing the stem or support K and upper plunger $i'$ downwardly upon the brick, and the brick will be pressed into the mold or die $r^2$. At the same time cams $c$ and $c^{16}$ will lower the cam-staffs G with the lower plunger $i'$, so that the brick follows the die-block or plunger $i'$ into the mold-die $r^2$ and the brick receives the desired pressure of the upper plunger while it rests upon the lower plunger I, the latter being in turn supported by the short arm of the lever $b'$. At the next instant the brick will be raised by the upward motion of the plunger I, through the instrumentality of the cams $c^{16}$ and cam-staffs G, to a level with the die-table $t^7$. At the next revolution of the spur-wheel N this pressed brick will be pushed off the die-table $t^7$ by the action of the next brick, having received the same forward movement from the feed-slide P, onto the delivery-apron $a^5$. The thickness of the brick produced may be obviously regulated by adjusting the lever $b'$. It is obvious that the instant of throw of the feed-slide P may be adjusted by the disk cam M and the spur-wheel N, as secured by the nuts and bolts working in the slots $t^8$.

If it be desired to change the machine from a re-press to a dry press, the guides $g^3$ and $g^4$, the feeding-slide P, and the rocking shaft L, heretofore described, are removed and replaced by another rocking shaft L, similar in construction as to its arm F, but having two downwardly-projecting arms $m^{12}$. (See Fig. 16.) The arms $m^{12}$ are each provided with a link $l^5$, which connect them to opposing sides of a mold-feeder U, having in one end a feed-cavity $f^{18}$.

Secured to the die-table $t^7$, before referred to, is a feed-hopper Q, through which the material may be fed to fill the feed-cavity $f^{18}$. Figs. 18 and 19 illustrate in section the relative positions of the feeder U with respect to the mold $r^2$ and the feed-hopper Q.

Having thus described the invention, what is claimed as new is—

1. In a brick-pressing machine, the combination of a mold-box, upper and lower plungers for said mold, a cam-shaft provided with three cams, means for driving said shaft, a cam-housing for the intermediate cam, said housing consisting of front and back plates guided vertically, and top and bottom plates, the intermediate cam being designed to raise and lower said housing and the upper plunger being carried by said housing, two cam-staffs operatively connected to the lower plunger, said cam-staffs being provided with openings receiving respectively the two outside cams and said cam-staffs fitting between the front and back plates of the cam-housing and guided thereby at their ends, and guides H for the cam-staffs below said cam-housing, as and for the purpose set forth.

2. In a brick-pressing machine, the combination of a framework, a mold in said framework, upper and lower plungers designed to work in said mold, a cam-housing carrying the upper plunger and consisting of front and back plates and top and bottom plates, vertical guide-strips $g'$ secured to the framework and contacting with the outer face of the front and back plates of the cam-housing at the edges thereof whereby to guide said housing vertically, upper and lower wear-plates secured to the inner faces of the top and bottom plates of the cam-housing, cam-staffs operatively connected to the lower plunger and provided with openings to receive cams, and adjustable wear-plates in said openings, the cam-staffs fitting within the front and back plates of the cam-housing and being guided at their upper ends by said front and back plates and by the sides of the framework, a cam-shaft provided with an intermediate cam and two side cams, the intermediate cam working in the cam-housing and contacting with the upper and lower wear-plates to raise and lower said housing and the upper plunger, and the two side cams working respectively against the wear-plates in the openings of the cam-staffs whereby to raise the lower plunger, guides H embracing said cam-staffs below the cam-housing and means for actuating said cam-shaft substantially as set forth.

3. A brick-machine comprising a framework, a mold in said framework, upper and lower plungers designed to work in said mold, means for vertically reciprocating said plungers, said means including a driven spur-wheel, a cam-disk secured to said spur-wheel and axially adjustable thereon whereby to change the relative positions of its cam, a rock-shaft mounted in the framework and provided with an arm operatively connected to said cam-disk for actuation thereby, a reciprocating feeding device operatively connected to said rock-shaft and located at one side of the mold, a delivery-apron mounted at the opposite side of the mold, a shaft supporting one end of said apron, driving connections between the spur-wheel and said shaft of the apron, a shaft supporting the other and outer end of said apron, inclined struts $b^2$ secured at their lower ends to the framework and supporting the shaft at the outer end of the apron at their upper ends and rods $e'$ extending longitudinally from the upper ends of said struts to the shaft at the inner end of the apron.

WILLIAM L. ST. CLAIR.

Witnesses:
SAM RANEY,
WILLIAM R. HALL.